United States Patent
Dohta et al.

(10) Patent No.: US 10,719,978 B2
(45) Date of Patent: Jul. 21, 2020

(54) STORAGE MEDIUM, IMAGE PROCESSING SYSTEM, IMAGE PROCESSING APPARATUS AND IMAGE PROCESSING METHOD FOR TARGET OBJECT DETECTION

(71) Applicant: NINTENDO CO., LTD., Kyoto (JP)

(72) Inventors: Takuhiro Dohta, Kyoto (JP); Yuya Sato, Kyoto (JP); Minoru Hamaura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/906,145

(22) Filed: Feb. 27, 2018

(65) Prior Publication Data
US 2018/0253891 A1    Sep. 6, 2018

(30) Foreign Application Priority Data

Mar. 1, 2017   (JP) .................. 2017-037877

(51) Int. Cl.
| | |
|---|---|
| *G06T 15/50* | (2011.01) |
| *G06T 15/40* | (2011.01) |
| *G06T 15/20* | (2011.01) |
| *A63F 13/52* | (2014.01) |
| *A63F 13/42* | (2014.01) |
| *A63F 13/577* | (2014.01) |

(Continued)

(52) U.S. Cl.
CPC .......... *G06T 15/503* (2013.01); *A63F 13/42* (2014.09); *A63F 13/52* (2014.09); *A63F 13/577* (2014.09); *G06T 15/20* (2013.01); *G06T 15/405* (2013.01); *A63F 13/58* (2014.09); *A63F 13/92* (2014.09); *A63F 2300/64* (2013.01); *A63F 2300/6653* (2013.01); *G06T 2210/21* (2013.01); *G06T 2210/62* (2013.01)

(58) Field of Classification Search
CPC ..... G06T 15/503; G06T 15/405; A63F 13/42; A63F 13/52
See application file for complete search history.

(56) References Cited

U.S. PATENT DOCUMENTS

| | | | | |
|---|---|---|---|---|
| 6,361,438 B1 * | 3/2002 | Morihira | ................ | A63F 13/10 463/31 |
| 7,796,132 B1 * | 9/2010 | Nakagawa | ............ | G06T 15/503 345/426 |

(Continued)

FOREIGN PATENT DOCUMENTS

| | | | | |
|---|---|---|---|---|
| EP | 2105905 A2 * | 9/2009 | ............. | A63F 13/10 |
| JP | 2001-250129 | 9/2001 | | |

(Continued)

*Primary Examiner* — Terrell M Robinson
(74) *Attorney, Agent, or Firm* — Nixon & Vanderhye P.C.

(57) ABSTRACT

A non-limiting example game apparatus includes a display device, and a game screen is displayed on the display device. For example, a player character, a non-player character, a background object, etc. are displayed in the game screen. When finishing the drawing of a game image corresponding to the game screen, the smallest value of a Z value is acquired from a Z buffer. If the smallest value is less than a predetermined threshold value, when drawing a game image of a next frame, a target object that is near to a virtual camera is detected, and transparency of the target object that is nearer than a predetermined criterion is made to be increased.

18 Claims, 11 Drawing Sheets

(51) Int. Cl.
*A63F 13/92* (2014.01)
*A63F 13/58* (2014.01)

(56) References Cited

U.S. PATENT DOCUMENTS

| | | | | |
|---|---|---|---|---|
| 2002/0122036 | A1* | 9/2002 | Sasaki | G06T 15/405 345/422 |
| 2005/0237323 | A1* | 10/2005 | Shimamura | A63F 13/10 345/419 |
| 2008/0043022 | A1* | 2/2008 | Ishihara | A63F 13/10 345/428 |
| 2009/0015679 | A1* | 1/2009 | Hayakawa | G06T 13/20 348/207.1 |
| 2009/0027387 | A1* | 1/2009 | Furuhashi | G06T 15/02 345/421 |
| 2009/0163274 | A1 | 6/2009 | Kando | |
| 2011/0183765 | A1* | 7/2011 | Kobayashi | A63F 13/44 463/43 |
| 2011/0244956 | A1* | 10/2011 | Sakakibara | A63F 13/5255 463/31 |
| 2012/0058823 | A1* | 3/2012 | Minato | G06T 19/00 463/32 |
| 2012/0075429 | A1 | 3/2012 | Sakurai et al. | |
| 2015/0190718 | A1* | 7/2015 | Ohta | A63F 13/35 463/31 |
| 2018/0053337 | A1* | 2/2018 | Nakashima | G06F 3/012 |
| 2018/0152694 | A1* | 5/2018 | Oonishi | H04N 13/117 |

FOREIGN PATENT DOCUMENTS

| | | |
|---|---|---|
| JP | 2009-148466 | 7/2009 |
| JP | 2012-074881 | 4/2012 |

* cited by examiner

GAME SCREEN 100

102    104

GAME SCREEN  100

102     104

WORLD COORDINATE SYSTEM

WORLD COORDINATE SYSTEM

STORAGE MEDIUM, IMAGE PROCESSING SYSTEM, IMAGE PROCESSING APPARATUS AND IMAGE PROCESSING METHOD FOR TARGET OBJECT DETECTION

CROSS REFERENCE OF RELATED APPLICATION

The disclosure of Japanese patent application No. 2017-37877 filed on Mar. 1, 2017 is incorporated by reference.

FIELD

This application describes a storage medium, image processing system, image processing apparatus and image processing method, changing transparency of an object that is near to a virtual camera.

SUMMARY

It is a primary object of an embodiment(s) to provide a novel storage medium, image processing system, image processing apparatus and image processing method.

Moreover, it is another object of the embodiment(s) to provide a storage medium, image processing system, image processing apparatus and image processing method, capable of reducing a processing cost while securing detection accuracy of an object that is near to a camera.

A first embodiment is a non-transitory computer readable storage medium storing an image processing program that is executable by a computer, wherein the image processing program causes one or more processors of the computer to perform steps of: a drawing step; a determination step; and a detection step. The drawing step performs drawing processing of an image based on a virtual camera located in a virtual space by using a Z buffer for every predetermined drawing period. The determination step determines, after the drawing processing, whether there is a portion whose depth value is smaller than a predetermined value in the Z buffer. The detection step detects an object that is nearer than a predetermined criterion to the virtual camera in the virtual space when it is determined that there is a portion whose depth value is smaller than the predetermined value in the determination step at a time of previous drawing processing. The drawing step further performs the drawing processing of the virtual space so that the object that is near to the virtual camera detected in the detection step is displayed while increasing the transparency, or being not displayed.

According to the first embodiment, the processing that detects the object that is nearer than the predetermined criterion to the virtual camera when there is a portion whose depth value in the Z buffer is smaller than the predetermined value, it is possible to reduce a processing cost compared to a case where the detection step is performed every time. Moreover, since the object that is nearer than the predetermined criterion to the virtual camera is detected after determining based on the depth value that some object is arranged near the virtual camera, determination to be performed is restricted to a situation that at least something exists near the virtual camera, and therefore, even if determination is made with a margin to the predetermined criterion, it is possible to detect an object arranged near to the virtual camera with high accuracy. That is, the detection accuracy can be secured.

A second embodiment is the storage medium according to the first embodiment, wherein the determination step determines whether there is a portion whose depth value is smaller than the predetermined value by determining whether a smallest value of the depth value in the Z buffer is smaller than a predetermined threshold value.

According to the second embodiment, since only the smallest value of the Z buffer may be acquired, a processing load for determining whether the detection step is to be performed is not increased.

A third embodiment is the storage medium according to the first embodiment, wherein the object is defined with a model that serves as a drawing target and a simple shape that does not serve as a drawing target. The detection step detects, for each of the objects to be detected, an object that is nearer than the predetermined criterion to the virtual camera based on a positional relationship between the simple shape and the virtual camera.

According to the third embodiment, since the simple shape is used, it is possible to easily detect an object that is nearer than the predetermined criterion to the virtual camera even if the object is an object having a complex shape. Moreover, even if there is a case where the object that is the drawing target protrudes from the simple shape, since the object that is nearer than the predetermined criterion to the virtual camera is detected using the simple shape after it is determined that there is an object that is near to the virtual camera based on the depth value in the Z buffer, the detection accuracy can be secured.

A fourth embodiment is the storage medium according to the third embodiment, wherein the detection step detects a candidate of the object that is nearer than the predetermined criterion to the virtual camera in a search range that is set in a part of the virtual space based on an imaging range of the virtual camera.

According to the fourth embodiment, since a candidate of the object that is nearer than the predetermined criterion to the virtual camera is detected in the search range that is set in a part of the virtual space, it is only necessary to determine whether some objects included in the search range are nearer than the predetermined criterion to the virtual camera out of all the objects arranged in the virtual space, and therefore, it is possible to reduce determination processing as much as possible.

A fifth embodiment is the storage medium according to the third embodiment, wherein the simple shape is a simple shape that is used for collision determination of objects in the virtual space.

According to the fifth embodiment, since the simple shape for the collision determination is used, it is not necessary to prepare a simple shape for detecting the object that is nearer than the predetermined criterion to the virtual camera.

A sixth embodiment is the storage medium according to the third embodiment, wherein the detection step detects the object that is nearer than the predetermined criterion to the virtual camera based on a distance between the simple shape and a near clipping plane of the virtual camera.

According to the sixth embodiment, since a distance between the virtual camera and the near clipping plane is constant, it is possible to detect the object that is nearer than the predetermined criterion to the virtual camera based on the distance between the simple shape and the near clipping plane.

A seventh embodiment is the storage medium according to the first embodiment, wherein the image processing program further causes the one or more processors to perform a camera control step that controls the virtual camera based on an operation by the user.

An eighth embodiment is the storage medium according to the first embodiment, wherein the image processing program further causes the one or more processors to perform a camera moving step that makes the virtual camera move according to a movement of a player character when the movement of the player character in the virtual space is controlled based on an operation of a user.

A ninth embodiment is an imaging processing system, comprising: a drawing portion; a determination portion; and a detection portion. The drawing portion is configured to perform drawing processing of an image based on a virtual camera located in a virtual space by using a Z buffer for every predetermined drawing period. The determination portion is configured to determine, after the drawing processing, whether there is a portion whose depth value is smaller than a predetermined value in the Z buffer. The detection portion is configured to detect an object that is nearer than a predetermined criterion to the virtual camera in the virtual space when it is determined that there is a portion whose depth value is smaller than the predetermined value in the determination portion at a time of previous drawing processing. The drawing portion is configured to further perform the drawing processing of the virtual space so that the object that is near to the virtual camera detected in the detection portion is displayed while increasing the transparency, or being not displayed.

A tenth embodiment is an image processing apparatus, comprising: a Z buffer; a drawing processing portion; a determination processing portion; and a detection processing portion. The drawing processing portion is configured to perform drawing processing of an image based on a virtual camera located in a virtual space by using the Z buffer for every predetermined drawing period. The determination processing portion is configured to determine, after the drawing processing, whether there is a portion whose depth value is smaller than a predetermined value in the Z buffer. The detection processing portion is configured to detect an object that is nearer than a predetermined criterion to the virtual camera in the virtual space when it is determined that there is a portion whose depth value is smaller than the predetermined value in the determination processing portion at a time of previous drawing processing. The drawing processing portion is configured to further perform the drawing processing of the virtual space so that the object that is near the virtual camera detected in the detection processing portion is displayed while increasing the transparency, or being not displayed.

An eleventh embodiment is an image processing method, comprising steps of: (a) performing drawing processing of an image based on a virtual camera located in a virtual space by using a Z buffer for every predetermined drawing period; (b) determining, after the drawing processing, whether there is a portion whose depth value is smaller than a predetermined value in the Z buffer; (c) performing detection of an object that is nearer than a predetermined criterion to the virtual camera in the virtual space when it is determined that there is a portion whose depth value is smaller than the predetermined value in the step (b) at a time of previous drawing processing; and (d) making the step (a) to be further performed so as to perform the drawing processing of the virtual space so that the object that is near the virtual camera detected in the step (c) is displayed while increasing the transparency, or being not displayed.

According to each of the ninth to eleventh embodiments, like the first embodiment, it is possible to reduce a processing cost while securing detection accuracy of an object that is near to the camera.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

Figure 1:
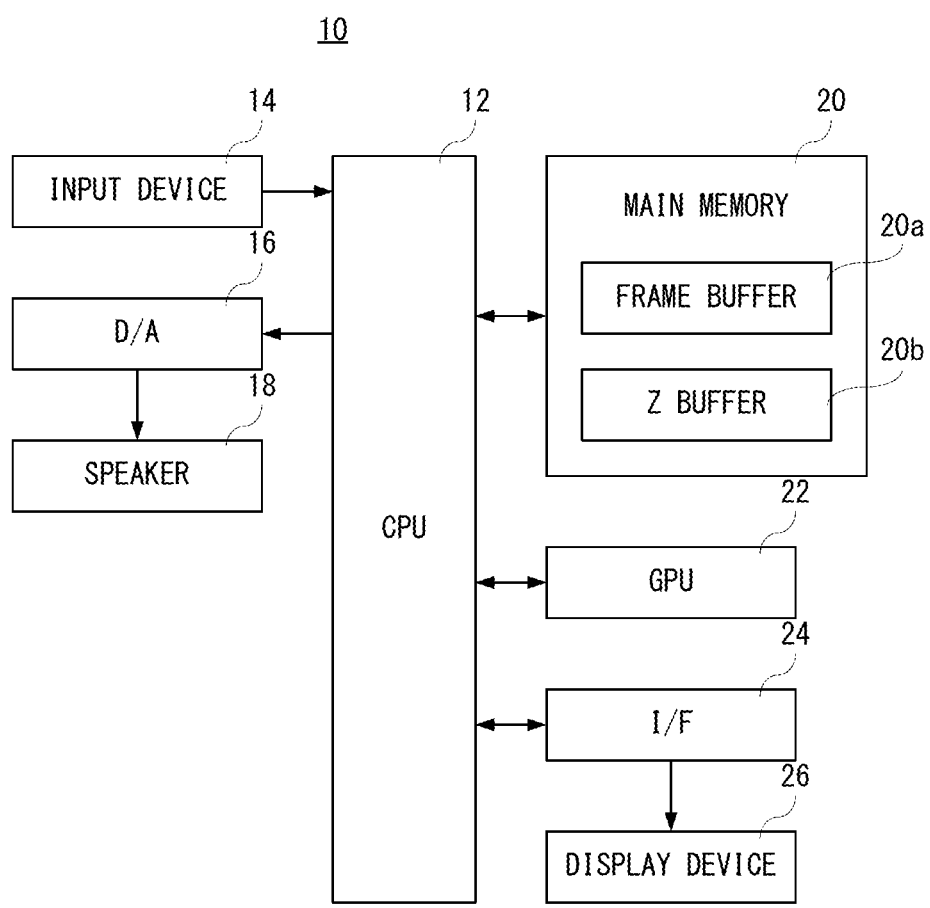
FIG. 1 is a block diagram showing a non-limiting example electrical configuration of a game apparatus.

With referring to FIG. 1, a non-limiting example game apparatus 10 that is an example of an image processing apparatus includes a CPU 12, and the CPU 12 is connected with an input device 14, a digital-to-analog (D/A) converter 16, a main memory 20, a GPU 22 and an interface (I/F) 24. Moreover, the game apparatus 10 includes a speaker 18 and a display device 26. The CPU 12 is connected to the speaker 18 via the D/A converter 16, and to the display device 26 via the I/F 24.

However, the image processing apparatus does not need to be limited to the game apparatus 10, and may be general-purpose PCs (various kinds of PCs, such as desktop PC, a notebook PC, a tablet PC, etc.), a portable telephone, a smartphone, etc. Moreover, as a game apparatus 10, it is possible to use a portable type game apparatus, a stationary type game apparatus, or a game apparatus capable of switching between a portable type and a stationary type, and further an arcade game machine can be also used. In a case of the stationary type game apparatus, since a monitor like a television receiver and a controller are connected to a game apparatus main body, it is possible to refer as a game system (image processing system) in this case.

The CPU 12 is in charge of overall control of the game apparatus 10. The input device 14 may be various kinds of push buttons or switches that are provided in the game apparatus 10, for example, or may be a controller that is connected to the main body of the game apparatus 10 in a wired or wireless manner and includes various kinds of push buttons or switches. The input device 14 is used by a user or player (hereinafter, simply called "player") for various kinds of operations or inputs, such as a menu selection, a game operation, a movement of a virtual camera, a zooming, etc. However, as the input device 14, input means, such as a pointing device like a touch panel, a microphone, a camera, etc. may be provided instead of the push buttons or switches or together with the push buttons or switches. Moreover, the touch panel may be built into the display device 26 described later. The display device 26 in this case is a touch panel integrated type display.

The D/A converter 16 converts sound data that is applied from the CPU 12 into an analog game sound that is output to the speaker 18. However, the game sound means sound necessary for a game, such as imitative sound of characters or objects of the game, a sound effect, and music (BGM).

The main memory 20 is a volatile memory, and used as a working memory and buffer memory of the CPU 12, and provided with a frame buffer 20a and a Z buffer (also called a depth buffer) 20b.

However, the frame buffer 20a and the Z buffer 20b may be provided in a memory other than the main memory 20 as long as it is a memory accessible by the GPU 22 described later.

The main memory 20 stores image generation data (data such as polygon data and texture data) necessary for the GPU 22 to execute graphics commands (drawing instruction).

The frame buffer 20a is a memory for drawing or storing the image data for one frame of a raster scan monitor (display device 26), for example, and is rewritten by the GPU 22 at every one frame (1/60 seconds, for example). Specifically, the frame buffer 20a stores color information of an image for each pixel in order. Here, the color information is data about R, G, B and A, and includes 8-bit R (red) data, 8-bit G (green) data, 8-bit B (blue) data and 8-bit A (Alpha) data, for example. The A data is data about a mask (Mat image). When the CPU 12 reads the image data of the frame buffer 20a so as to output to the display device 26 through the I/F 24, a three-dimensional (3D) game image is displayed on a screen of the display 26 device.

Moreover, the Z buffer 20b has a storage capacity corresponding to "the number of pixels of the frame buffer 20a×the number of bits of the depth data (depth information) per pixel", and stores the depth data (Z value) of a dot corresponding to each storing position of the frame buffer 20a.

Moreover, the main memory 20 stores a program about a game application to be executed with the game apparatus 10. However, the application does not need to be limited to the game application, and various kinds of applications such as a document production application, an email application, a painting application, a character or letter practice application, a linguistic training application, a learning application, etc. are executable.

Although illustration is omitted, an application program is stored in a nonvolatile memory such as an HDD or a ROM incorporated in the game apparatus 10, and read-out from the nonvolatile memory to be stored in the main memory 20. Moreover, an application program may be read-out from an external memory such as an SD card, memory stick, optical disk detachably attachable to the game apparatus 10 to be stored in the main memory 20. Furthermore, when the game apparatus 10 is provided with a communication function, an application program may be downloaded from a computer that is communicably connected to the game apparatus 10 to be stored in the main memory 20. About these, any one method or two or more methods can be adopted.

The GPU 22 forms a part of drawing portion, and generates image data according to graphics commands from the CPU 12. The GPU 22 generates the image data by performing calculation processing required for displaying of 3D graphics according to the graphics commands, for example, processing that is pre-processing for rendering, such as coordinate transformation from 3D coordinates to 2D coordinates and final rendering processing such as texture mapping. Here, the texture mapping means processing of synthesizing a color of polygon and a color of texture on a pixel basis and outputting a final color on a pixel basis.

The display device 26 is an LCD or an organic EL display, and is provided in the game apparatus 10 integrally. However, the display device 26 like a television monitor may be connected to the main body of the game apparatus 10.

In addition, an electric configuration of the game apparatus 10 shown in FIG. 1 is a mere example, and it does not need to be limited to this.

With the game apparatus 10 as described above, it is possible to play a game that advances in a virtual space (within a virtual game space). In the game of this embodiment, a player character 102 (see FIG. 2) can be freely moved according to an operation of the player within a map that is set inside the virtual game space. In the virtual game space, the player character 102 fights with an enemy character, acquires an item, or arrives at a target location or position, thereby to achieve a final goal.

In addition, in the game of this embodiment, when a physical strength value (HP: Hit Point) of the player character 102 runs out (becomes zero (0)), the game is over. For example, the physical strength value is decreased when the player character 102 performs an action such as a movement. When the player character 102 is attacked by the enemy character or when the player character 102 comes outside the virtual game space, such as being fallen in a valley (mistake occurs), the game is also over. On the other hand, the physical strength value is increased when the player character 102 eating food, taking medicine, or taking sleep.

Figure 2:
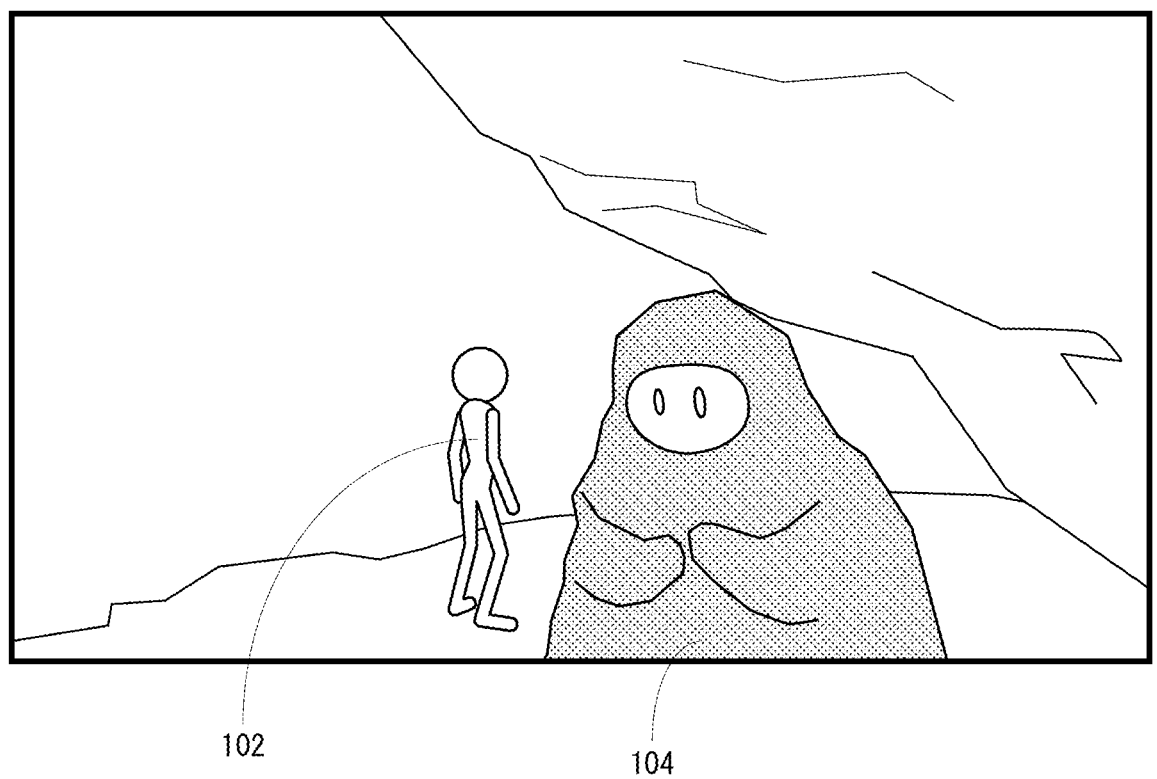
FIG. 2 is an illustration view showing a non-limiting example first game screen displayed on a display device shown in FIG. 1.

A non-limiting example game screen 100 that is displayed on the display device 26 in the game of this embodiment is shown in FIG. 2. Although detailed description is omitted, in the virtual game space, virtual objects (background objects) such as plants (including flowers) objects, terrain objects and building objects are provided, and a player character 102 is arranged. Moreover, in the virtual game space, there are also arranged non-player characters 104 such as enemy characters, villager characters, etc. Furthermore, there are arranged in the virtual game space with other non-player characters 104 such as items. An image that such a virtual game space is imaged by a virtual camera 200 (see FIG. 3) is displayed on the display device 26 as a game screen 100.

Specifically, a character(s) or object(s) (hereinafter, simply called an "object") are arranged (modeled) in a 3D virtual game space, and a 3D image viewed from the virtual camera 200 (viewpoint) (imaged image by the virtual camera 200) is subjected to coordinate transformation into viewpoint coordinates or camera coordinates so that a position of the virtual camera 200 may serve as an origin. The image having been subjected to the coordinate transformation is prospectively projected on a screen (projection screen or virtual screen) with centering on a viewpoint position (perspective projection transformation). The image that is projected on the projection screen is displayed on the display device 26 in accordance with a Z buffer algorithm as the game screen 100.

However, the object is expressed (defined) by a model defined in a local coordinate system, and is arranged in a world coordinate system (in the virtual game space) based on the model.

Here, in the Z buffer algorithm, depth information (Z value) is applied to each pixel constituting a screen such as the game image 100 in addition to the color information (RGB values), when drawing an image in the frame buffer 20a, the depth information of the pixels of the same coordinates are compared with each other, so that a pixel that is nearer to the front is written in the frame buffer 20a. More specifically, in the Z buffer algorithm, the drawing is sequentially performed from an object far from the virtual camera 200 (far side or deeper side) to an object near to the virtual camera 200 (near side or front side), and when drawing an object at a predetermined pixel of the frame buffer 20a, the Z value of a surface of the object concerned is saved in the Z buffer 20b. Next, when a further object is to be drawn at the same pixel (hereinafter, may be called a "target pixel"), a Z value of the further object to be drawn this time is compared to the above-described saved Z value.

When the Z value of the further object is larger, that is, if the further object exists the deeper side than the already drawn object (object having been drawn) when viewing from the virtual camera 200, the further object is hidden by the already drawn object on the front side (near side) and thus invisible, and therefore, the drawing processing for the further object at the target pixel is not newly performed.

On the contrary, when the Z value of the further object is smaller, that is, if the further object exists at the front side compared to the already drawn object when viewing from the virtual camera 200, the drawing processing for the further object is newly performed at the target pixel. That is, the further object is drawn (overwritten) at the target pixel. At this time, when the further object is opaque, the further object will be rewritten with the already drawn object, but when the further object is not opaque, the further object is drawn translucent or transparent on this side (front side) of the already drawn object.

Normally, the virtual camera 200 is located behind the player character 102 with a predetermined positional relationship, and follows the player character 102. A direction of the virtual camera 200 is also determined to a predetermined direction. In this embodiment, a gazing point is set to a predetermined position (center (waist) position) of the player character 102, and the direction of the virtual camera 200 is determined so as to turn to the gazing point. Moreover, an angle of view of the virtual camera 200 is set as a predetermined angle of view. However, the angle of view of the virtual camera 200 may be arbitrarily changed according to a scene 150. Moreover, according to an operation of the player at least one of the position, the direction and the angle of view of the virtual camera 200 may be changed (controlled). In this case, the virtual camera 200 does not follow the player character 102.

Figure 3:
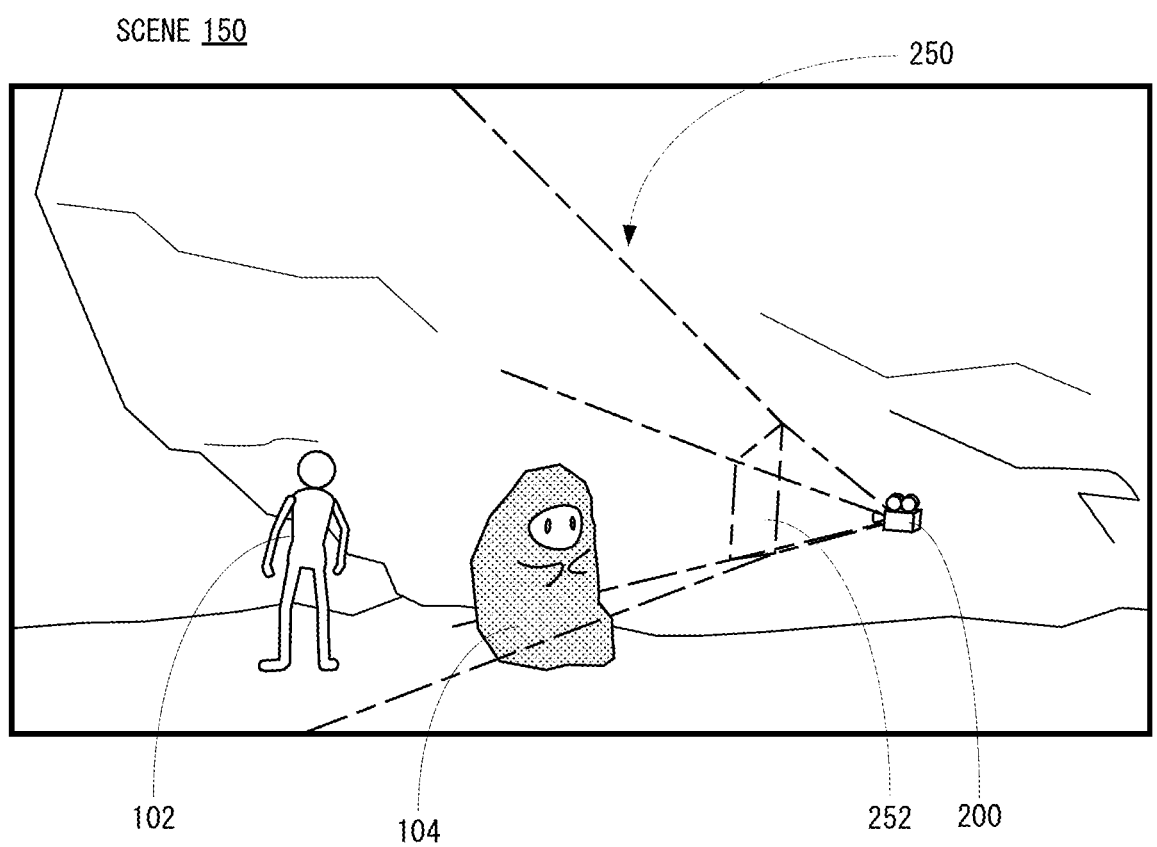
FIG. 3 is an illustration view showing a non-limiting example state where a part of a scene is viewed from a transverse direction when the game screen shown in FIG. 2 is displayed.

FIG. 3 is an illustration view showing a non-limiting example state where a part of the scene 150 in a case where the game screen 100 shown in FIG. 2 is to be displayed is viewed from a point different from the virtual camera 200. In this FIG. 3 (FIG. 4 described later is also the same), the virtual camera 200 is illustrated in order to indicate intelligibly a distance d (positional relationship) between the virtual camera 200 and the non-player character 104 existing (being arranged) between the player character 102 and the virtual camera 200. Moreover, a part of an imaging range 250 of the virtual camera 200 is illustrated in FIG. 3. An imaged image of the virtual camera 200 shown in this FIG. 3 corresponds to the game screen 100 shown in FIG. 2.

As also seen from FIG. 3, when the virtual camera 200 serves as a reference, the non-player character 104 exists near to the virtual camera 200 compared to the player character 102. Moreover, the non-player character 104 is away from the virtual camera 200 compared to a near clipping plane 252. Therefore, as shown in FIG. 2, the non-player character 104 is displayed on the front side compared to the player character 102 in the game screen 100.

In case shown in FIG. 2 and FIG. 3, the player character 102 stands so that the back is turned to the non-player character 104, and faces far (toward the deep side of the screen). Moreover, the non-player character 104 is squatting on the ground and faces the front (toward the front side of the screen).

Figure 4:
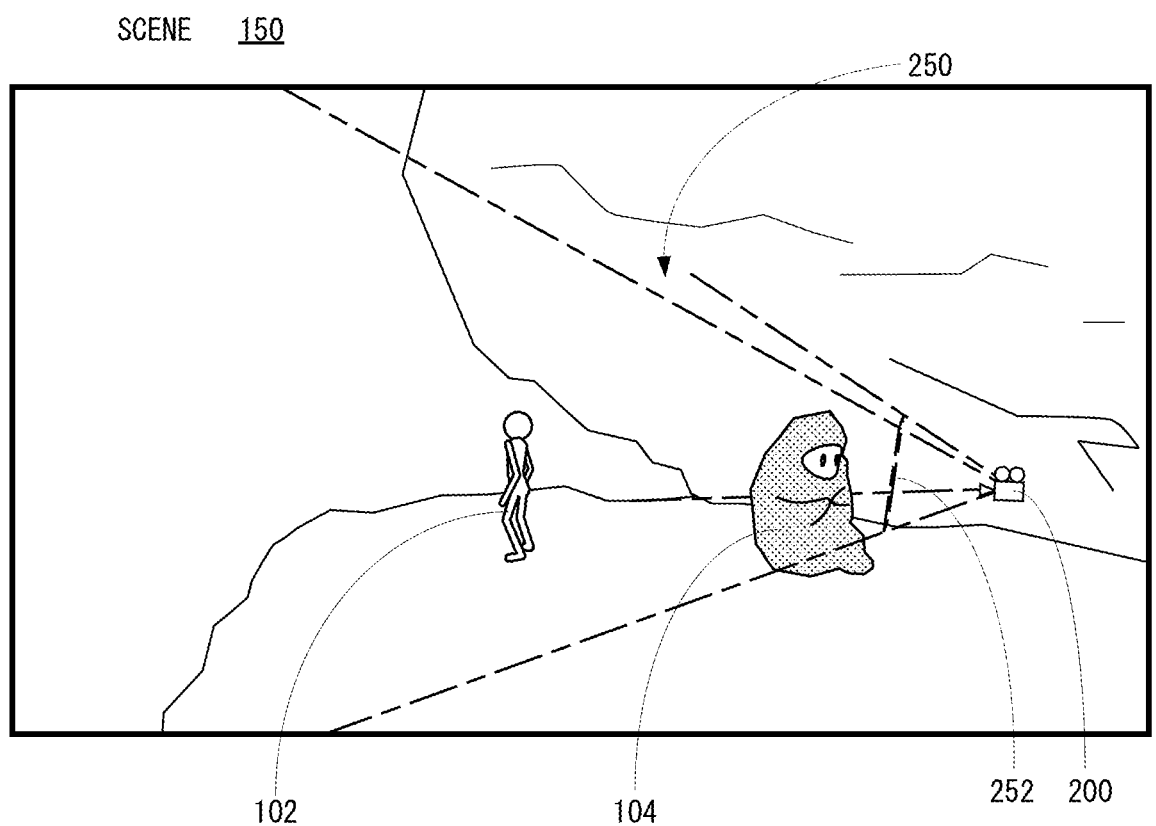
FIG. 4 is an illustration view showing a non-limiting example state where a virtual camera is brought close to a non-player character in FIG. 3.
Figure 5:
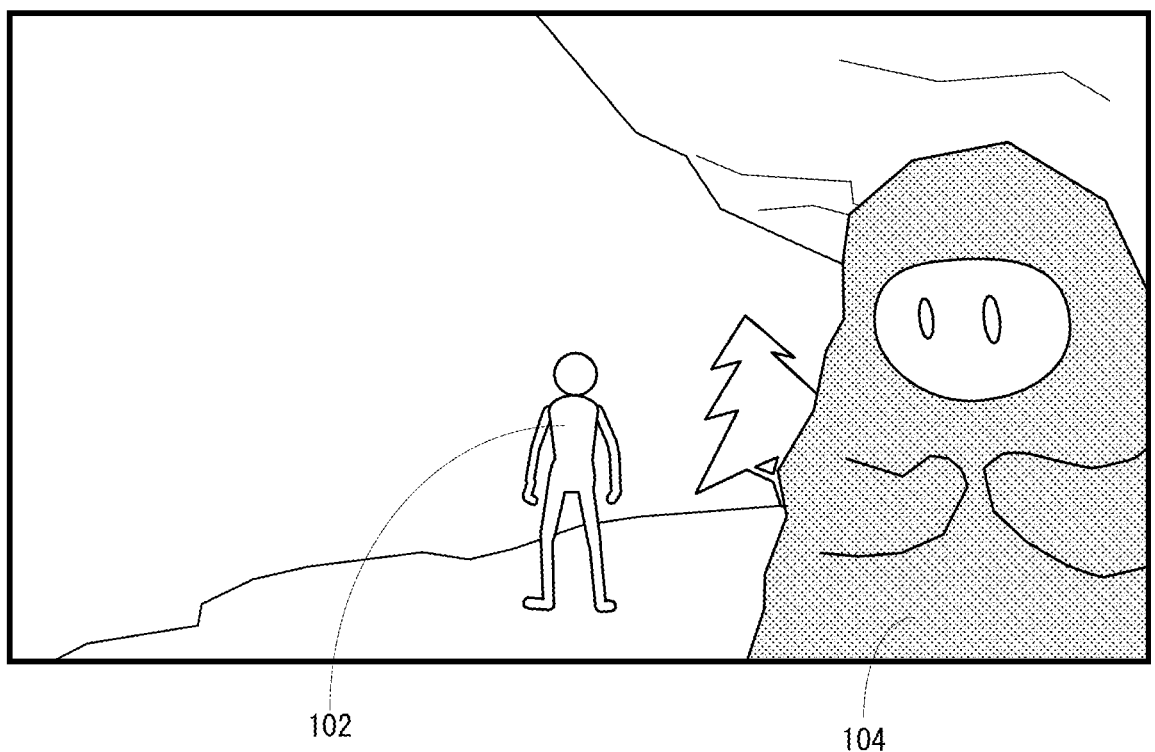
FIG. 5 is an illustration view showing a non-limiting example second game screen displayed on the display device in a case shown in FIG. 4.

FIG. 4 is an illustration view showing a non-limiting example scene 150 when bringing the virtual camera 200 close to the non-player character 104 from a state shown in FIG. 3. FIG. 5 is an illustration view showing a non-limiting example game screen 100 corresponding to the imaged image that is imaged by the virtual camera 200 in a state shown in FIG. 4.

In a state shown in FIG. 2 and FIG. 3, if the player character 102 is moved according to an operation of the player, the virtual camera 200 is also moved according to a movement of the player character 102. If the player character 102 is moved toward the deep side of the game screen 100 (here, a direction away from the non-player character 104), the virtual camera 200 is also moved according to that movement. At this time, as shown in FIG. 4, the virtual camera 200 approaches the non-player character 104. In other words, the near clipping plane 252 comes close to the non-player character 104. In the game screen 100 corresponding to the imaged image that is imaged by the virtual camera 200 in the state shown in this FIG. 4, as can be seen also in FIG. 5, the non-player character 104 is displayed with being closed-up (displayed largely).

Therefore, when the player character 102, the non-player character 104 and the virtual camera 200 are aligned on a straight line, for example, a whole of the player character 102 may be hidden by the non-player character 104, and thus, the player may not visually recognize the player character 102. Moreover, in a case where a part of the player character 102 is hidden by the non-player character 104, or even in a case where the player character 102 is not hidden, there is a possibility that the appearance of the game screen 100 is bad and the player is sometimes hard to watch the player character 102 or the game screen 100. When the virtual camera 200 further approaches the non-player character 104, the near clipping plane 252 of the virtual camera 200 enters into the model of the non-player character 104, and an inside of the non-player character 104 becomes to be drawn. In such a case, it becomes difficult to understand what is drawn, and the appearance of the game screen 100 becomes bad.

Therefore, in this embodiment, it is determined whether the virtual camera 200 approaches the target object, and the target object that is determined to be approached is displayed in a transparent or translucent manner. That is, the virtual space is drawn so that the transparency of the target object near the virtual camera 200 becomes high. Here, the target object means an object to be subjected to the processing of displaying in a transparent or translucent manner when arranged nearer than a predetermined criterion to the virtual camera 200.

Figure 6:
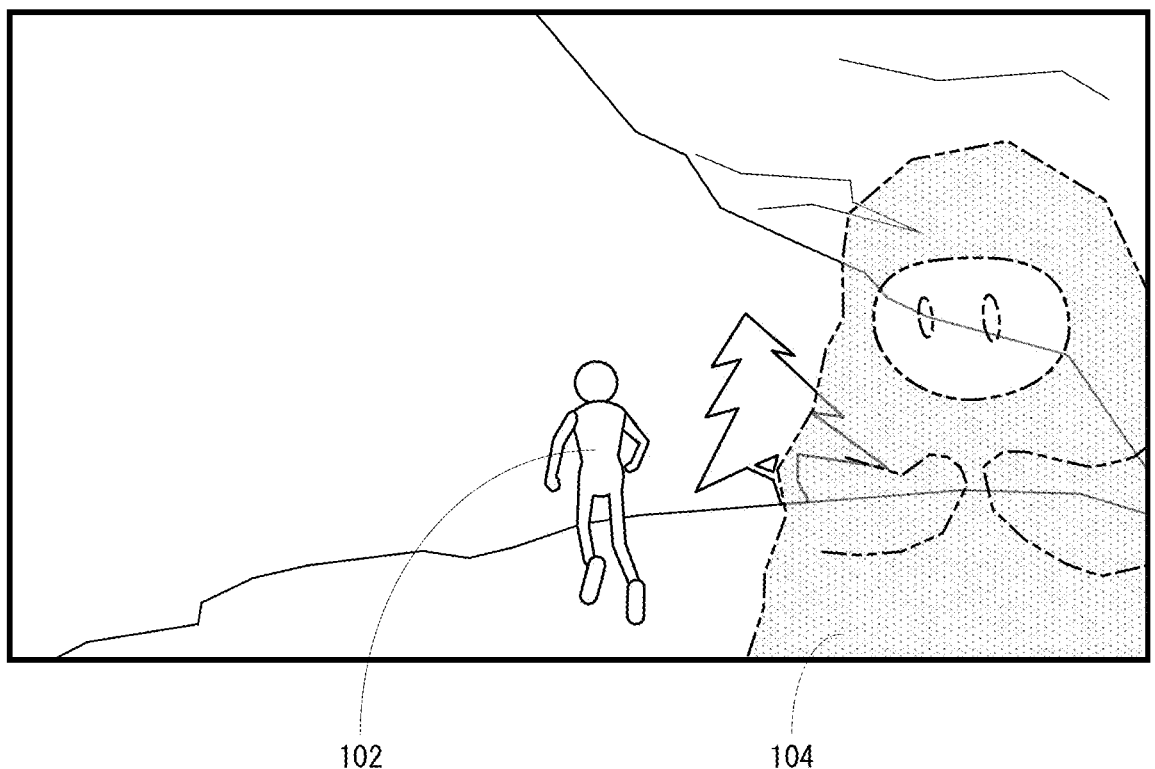
FIG. 6 is an illustration view showing a non-limiting example third game screen displayed on the display device shown in FIG. 1.

FIG. 6 shows a non-limiting example game screen 100 in a case where the non-player character 104 is drawn translucent when the virtual camera 200 further approaches the non-player character 104 from the case shown in FIG. 4. Thus, when the non-player character 104 is drawn translucent, it is possible to visually recognize an object existing in the rear side of the non-player object 104 by passing through the non-player character 104. Naturally, the same can be said when the non-player character 104 is drawn transparent (so as not to be displayed on the display device 26).

In addition, in the examples shown in FIG. 3-FIG. 6, although a case where the virtual camera 200 is moved according to a movement of the player character 102 when the player character 102 is moved according to an operation of the player is described, this is the same for a case where the virtual camera 200 is moved according to an operation of the player. Therefore, when the virtual camera 200 approaches the player character 102, the player character 102 may be made translucent or transparent.

In this embodiment, since the drawing processing is performed by the Z buffer algorithm, after drawing, first, it is determined, based on the Z value that is saved in the Z buffer 20b, whether any object exists near the virtual camera 200. When it is determined that an object exists near the virtual camera 200 based on the Z value, prior to the drawing processing at a next time, it is determined, based on positional information, whether the target object is arranged near the virtual camera 200. As for the object arranged near the virtual camera 200, in the drawing processing, the object is drawn so as to be displayed while increasing the transparency, or being not displayed.

Specifically, when finishing the drawing of the image for one frame in the frame buffer 20a, the smallest value is acquired from Z values of respective pixels saved in the Z buffer 20b, and it is determined whether the smallest value of the Z value is smaller than a predetermined threshold value (first threshold value). That is, it is determined whether there is any portion (pixel) that the Z value smaller than the first threshold value is saved in the Z buffer 20b. Since there are plural types of the target objects and respective target objects differ in shape and size, the first threshold value is set to a value so that all the target objects never touch the near clipping plane 252. However, in this embodiment, since it is determined whether any object exists near the virtual camera 200 based on the Z values obtained from a drawing result in a previous frame, the first threshold value is set to such a value that no object contact the near clipping plane 252 at the time of next drawing even if the virtual camera 200 or/and an object is moved. The first threshold value is set to a value corresponding to a distance longer than a distance indicated by a second threshold value described later.

When the smallest value of the Z value is equal to or more than the first threshold value, it is determined that no object is arranged (exists) near the virtual camera 200, and therefore, the drawing processing for the image of a next frame is performed without reducing A data of the object from a maximum value (A=1).

On the other hand, when the smallest value of the Z value is less than the first threshold value, it is determined that there is a possibility that any object is arranged (exists) near the virtual camera 200, and the target object arranged near the virtual camera 200 is searched. That is, the target object arranged near the virtual camera 200 among all the target objects arranged in the virtual game space is detected. That is, a candidate of the target object to be displayed translucent or transparent is detected.

However, in a case where the target object is arranged near the virtual camera 200 compared to the near clipping plane 252, or in a case where the target object does not contact to or does not get caught on the near clipping plane 252 even if it is moved or deformed in a short time of few or several frames to few or several tens frames at a time that the target object is arranged far from the virtual camera 200, the target object is not displayed in the game screen 100, and therefore, no target object is searched in a range too near the virtual camera 200 and a range too far from the virtual camera 200. However, even in a case where the target object is arranged on an outside of a right end of an angle of view of the virtual camera 200 or an outside of a left end of the angle of view of an angle of view of the virtual camera 200, if there is a possibility that the target object contacts to the near clipping plane 252 when it is moved or deformed in a short time, the target object may be displayed in the game screen 100, and therefore, it is necessary to search the target object even if the target object beyond the angle of view.

In this embodiment, deformation of the object means that a shape or/and size of the object is changed by stretching a hand or/and leg, by changing a hand or/and leg in size, or by making the object equip with or hold an item such as a weapon.

Figure 7A:
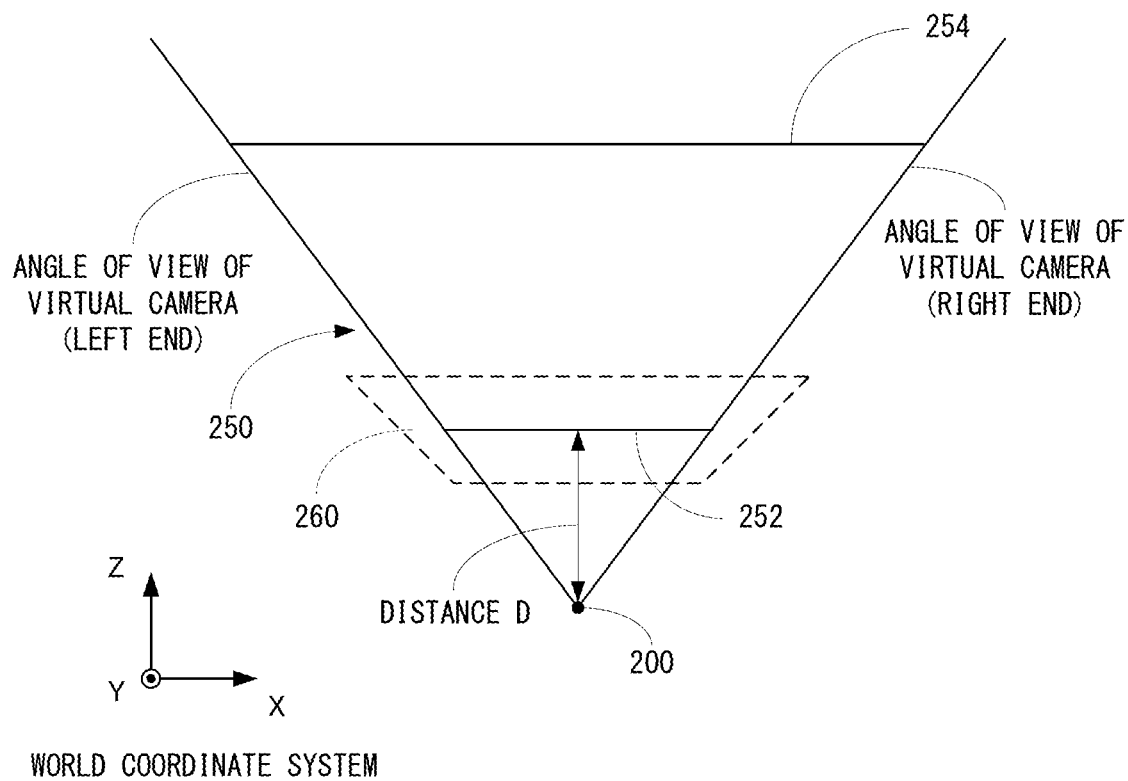
FIG. 7A is an illustration view showing a non-limiting example imaging range of a virtual camera when viewing a virtual game space in a bird's-eye manner from the right above.
Figure 7B:
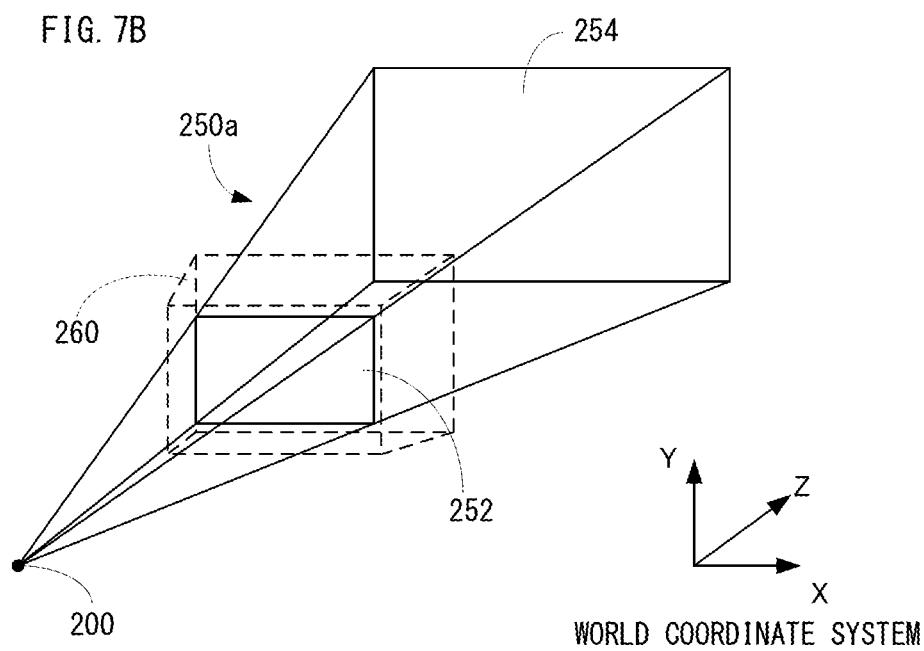
FIG. 7B is an illustration view showing a non-limiting example pyramidal cone constituted by a viewpoint and a far clipping plane viewed obliquely rear the viewpoint.

Therefore, a range as indicated by a dotted line in FIG. 7A and FIG. 7B is set as a search range 260. FIG. 7A is a bird's-eye view viewed from right above of a non-limiting example part of the 3D virtual game space. FIG. 7B is an illustration view viewed obliquely rear of the virtual camera 200, showing a non-limiting example pyramidal cone (quadrangular pyramid) 250a in a case where the virtual game space is viewed from the virtual camera 200. The pyramidal cone 250a is defined by the virtual camera 200 (viewpoint) and a far clipping plane 254 when the near clipping plane 252 and the far clipping plane 254 are respectively set in the virtual space. However, a portion of a square truncated pyramid of the pyramidal cone 250a sandwiched by the near clipping plane 252 and the far clipping plane 254 is a visual volume. Moreover, in FIG. 7A and FIG. 7B, various kinds of objects are omitted.

As shown in FIG. 7A and FIG. 7B, the search range 260 is set in a part of the virtual game space based on the imaging range 250. Specifically, the search range 260 includes the near clipping plane 252 in an inside thereof, and has such a size (range) that the target object does not contact to or does not get caught on (cross) the near clipping plane 252 even if the target object is moved or deformed in a short time. This applies not only to the horizontal direction of the imaging range 250 but also to the vertical direction. Since there are plural types of the target objects and respective target objects differ in shape and size as described above, a size of the search range 260 is set by taking shapes and sizes of the respective target objects into account. As shown in FIG. 7A, when a part of the virtual space is viewed from above directly in a bird's eye manner, the search range 260 has a trapezoidal shape, and as shown in FIG. 7B, when viewed obliquely rear of the virtual camera 200, it has a shape of a truncated pyramid. However, the search range 260 may be set as a shape of a rectangular parallelepiped.

When the target object arranged in the search range 260 is detected, that is, when the target object is arranged near the virtual camera 200, it is determined whether a distance d between this target object and the virtual camera 200 is less than a predetermined threshold value (a second threshold value). That is, it is determined whether the target object arranged near the virtual camera 200 should be made translucent or transparent. The second threshold value (predetermined criterion) is set as a distance that a distance equivalent to a predetermined margin (allowance) is added to a distance D from the virtual camera 200 to the near clipping plane 252. The reason why the second threshold value is thus set is that, as described above, the shapes and the sizes of the target objects are different depending on the types.

In addition, whether the target object is arranged in the search range 260 is determined based on whether a three-dimensional position of the target object is included in the search range 260.

Moreover, when calculating the distance d between the virtual camera 200 and the target object, calculation of the distance d becomes complicated and a processing cost is increased if the shape of the model that the target object is drawn is used as it is. Therefore, in this embodiment, it is determined whether the distance d of the target object and the virtual camera 200 is less than the second threshold value by using a simplified shape (simple shape) SH.

Figure 8:
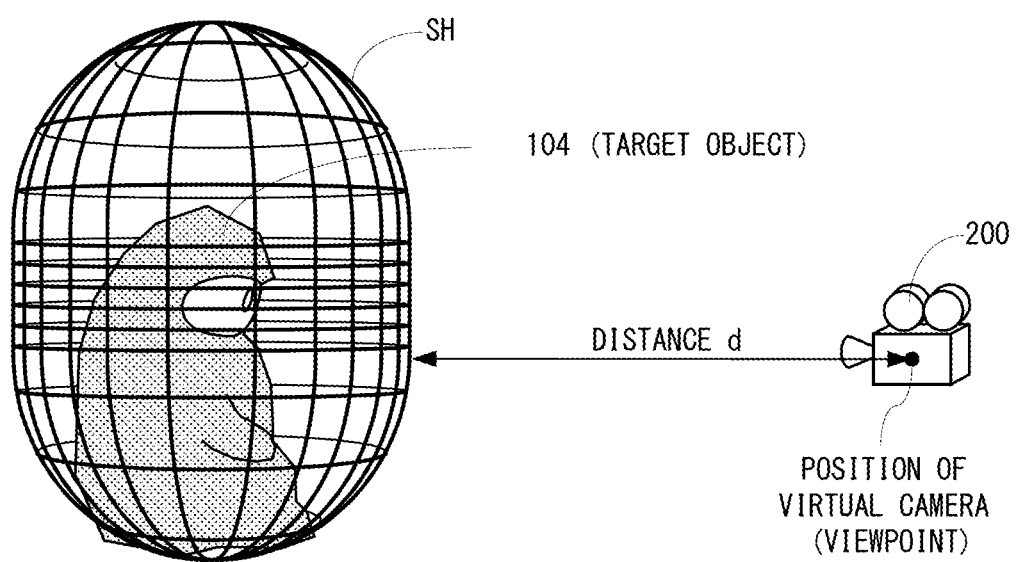
FIG. 8 is an illustration view showing a non-limiting example simple shape that is defined to a target object and a distance between the virtual camera and the simple shape.

The simple shape SH is a predetermined shape that is used for collision determination (hit determination). Since this simple shape SH is a virtual shape, it is not drawn. As shown in FIG. 8, in this embodiment, the predetermined shape is a capsule shape. That is, a portion with a predetermined distance from a line segment having a predetermined length and extending in a vertical direction in the virtual game space is made as a determination shape. In addition, for actual determination, it is not necessary to maintain a model of the capsule shape, and it is sufficient to define the line segment and the distance. However, the predetermined shape may be a spherical shape or a cylindrical shape. Moreover, the distance d between the simple shape SH and the virtual camera 200 is the shortest distance between the simple shape SH and the virtual camera 200. In this embodiment, a height of the player character 102 is set as 180 cm in the virtual game space, a length of the predetermined line segment is about 40-50 cm, and the predetermined distance is set to about 80-100 cm. This is a size that the target object does not protrude from the simple shape SH even when the object of normal size such as the player character 102 stretches hand and foot. Moreover, the simple shape SH is set so that the lowest point thereof corresponds to the lowest point of the object such as the player character 102.

As described above, the simple shape SH is set in the size that the object having the normal size does not protrude from the simple shape SH even when extending limbs, but there is an occasion that a part of the object protrudes from the simple shape SH in case of a large object or a long object in part. In such a case, although it is conceivable to lengthen the distance determining whether the target object is near and to give a margin, only by lengthening the distance, the object that is not so near to the virtual camera 200 may also be detected, and the detection accuracy may be lowered. However, in this embodiment, since it is determined whether the distance d with the virtual camera 200 is less than the second threshold value by using the simple shape SH after determining that any object is arranged near the virtual camera 200 based on the Z value, it is possible to detect the target object arranged near the virtual camera 200 with a high degree of accuracy even if a determination is made with a margin to the second threshold value because a situation to be determined is restricted to a situation that at least something exists near the virtual camera 200. That is, the detection accuracy is securable. Moreover, since there is also no necessity of always determining distance, a processing cost is reducible.

The target object that the distance d between the simple shape SH and the virtual camera 200 is equal to or more than the second threshold value among the target objects is not made translucent or transparent. That is, the value of the A data is not changed. On the other hand, the target object that the distance d between the simple shape SH and the virtual camera 200 is less than the second threshold value among the target objects is made translucent or transparent. That is, the value of the A data is decreased. In this embodiment, at every time that it is determined that the distance d between the simple shape SH and the virtual camera 200 is less than the second threshold value (every frame), the value of the A data is decreased to a half. That is, transparency is gradually increased. However, a predetermined value may be subtracted at every frame from the value of the A data.

In addition, although it is determined whether the distance d between the simple shape SH and the virtual camera 200 is less than the second threshold value in this embodiment, since a distance D between the virtual camera 200 and the near clipping plane 252 is constant, it may be determined whether a distance between the simple shape SH and the near clipping plane 252 is less than a predetermined threshold value.

When the target object is opaque, the value of the A data is 1 (one) (maximum value), and the target object is rewritten with the object having been already drawn in the frame buffer 20*a*. When the target object is not opaque, the value of the A data is equal to or more than 0.0001 (minimum value) and less than the maximum value, and the target object is drawn translucent or transparent at this side (front side) compared to the object having been already drawn. In this embodiment, the minimum value of the A data is "0.0001" and the A data is not decreased any more.

In addition, in this embodiment, the minimum value of the A data is set to "0.0001" because the target object is not drawn when A=0. Since the Z value of the target object is not saved in the Z buffer 20*b* when the target object is not drawn, it is impossible to correctly determine whether the target object is arranged near the virtual camera 200 with using the Z value. Therefore, in another embodiment, the minimum value may be set as A=0 if assuming that the Z buffer 20*b* is updated even in case of A=0. In addition, in case of A=0, an object is made transparent completely.

Moreover, when the distance d with the virtual camera 200 becomes equal to or more than the second threshold value after the target object is made translucent or transparent, the value of the A data is increased. In this embodiment, at every time that it is determined that the distance d between the simple shape SH and the virtual camera 200 is equal to or more than the second threshold value, the value of the A data is increased to a multiple. That is, the transparency is gradually decreased. However, a predetermined value may be added at every frame to the value of the A data. By doing like this, it is possible to suppress the rapid change in appearance and make it look natural. In addition, the maximum value of the A data is "1", and the A data is not increased any more.

Therefore, when the distance d with the virtual camera 200 is less than the second threshold value, the transparency (or opacity) of the object is gradually increased (or decreased), and when the distance d with the virtual camera 200 becomes equal to or more than the second threshold value after the transparency (or opacity) is increased (or decreased), the transparency (or opacity) of the object is gradually decreased (or increased). Therefore, a change of the game screen 100 or the transparency (or opacity) of the object is smooth, resulting in a natural change.

In addition, although illustration is omitted, what whose transparency is to be changed is the target object itself, and does not change the transparency of the shadow of the target object and the transparency of the light from the target object that functions as a light source. This is because only the target object is made translucent or transparent in consideration of the ease of viewing the game screen 100, and the existence of the target object itself does not disappear. For example, in a case where an object imitating a lamp is made transparent, if a light thereof is also made transparent, the game screen 100 becomes dark despite the fact that the lamp is not extinguished, so that the light of the lamp is kept intact.

Figure 9:
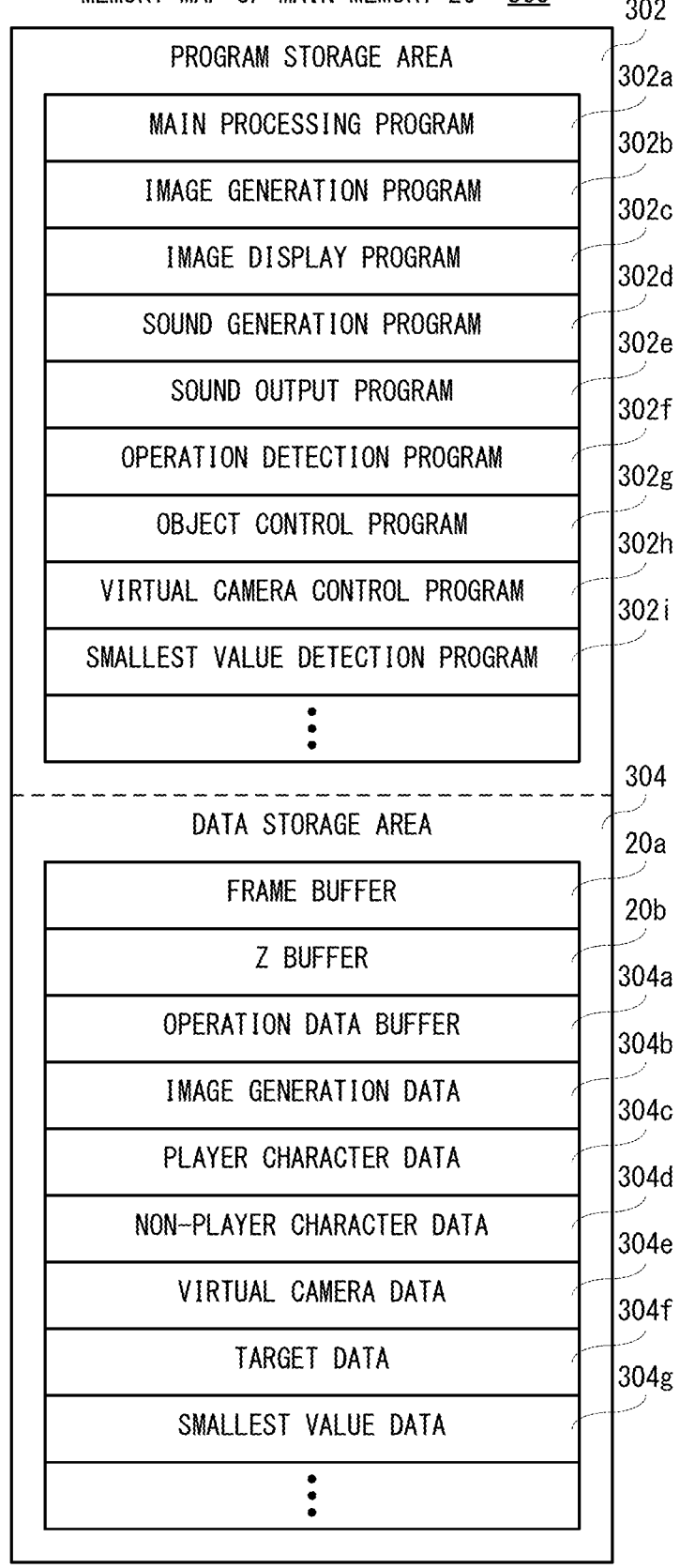
FIG. 9 is an illustration view showing a non-limiting example memory map of a main memory shown in FIG. 1.

FIG. 9 is an illustration view showing a non-limiting example memory map 300 of the main memory 20 of the game apparatus 10 shown in FIG. 1. As shown in FIG. 9, the main memory 20 includes a program storage area 302 and a data storage area 304. The program storage area 302 is stored with a program (game program) for an application of the game of this embodiment, and the game program includes a main processing program 302a, an image generation program 302b, an image display program 302c, a sound generation program 302d, a sound output program 302e, an operation detection program 302f, an object control program 302g, a virtual camera control program 302h, a smallest value detection program 302i, etc.

The main processing program 302a is a program for processing a main routine of entire processing (entire game processing) for the game of this embodiment.

The image generation program 302b is a program for generating image data of a game image with using image generation data 304b. For example, a virtual game space is drawn, the drawn virtual game space is subjected to perspective projection transformation, and image data of the game image corresponding to the game screen 100 is generated (drawn) in the frame buffer 20a in accordance with a Z buffer algorithm. The image display program 302c is a program for outputting the image data of the game image generated according to the image generation program 302b to the display device 26.

The sound generation program 302d is a program for generating sound data corresponding to a game sound. The sound output program 302e is a program for outputting the sound data generated according to the sound generation program 302d to the speaker 18 through the D/A converter 16.

The operation detection program 302f is a program for detecting operation data that is input from the input device 14 according to an operation by the player. The detected operation data is stored in an operation data buffer 304a described later.

The object control program 302g is a program for causing the player character 102 to perform movement or the like with following to the operation data, or for causing the non-player character 104 to be arranged (to appear) or to perform movement or the like without following the operation data. The virtual camera control program 302h is a program for controlling at least one of a position, a direction and an angle of view of the virtual camera 200 with following the operation data or without following the operation data.

The smallest value detection program 302i is a program for detecting the smallest value of the Z value from the Z buffer 20b when the game screen 100 is displayed (updated), that is, when one frame period (predetermined drawing period) elapses. Smallest value data 304g corresponding to the detected smallest value of the Z value is stored in the data storage area 304.

Although illustration is omitted, the program storage area 302 is stored with a communication program for performing communication with other game apparatuses or computers, a save program for saving game data in the nonvolatile memory, etc.

As shown also in FIG. 1, the frame buffer 20a and the Z buffer 20b are provided in the data storage area 304. Since the frame buffer 20a and the Z buffer 20b have already been described, duplicate description will be omitted. Moreover, the operation data buffer 304a is also provided in the data storage area 304. The operation data buffer 304a stores the operation data that is detected according to the operation detection program 302f in time series. If the operation data is used for processing of the CPU 12, the same is deleted from the operation data buffer 304a.

Moreover, the data storage area 304 stores data such as the image generation data 304b, player character data 304c, non-player character data 304d, virtual camera data 304e, target data 304f, the smallest value data 304g, etc.

The operation data buffer 304a is an area for temporarily storing the operation data from the input device 14. The image generation data 304b is data such as polygon data, texture data, etc. for generating the image data of the game screen 100, etc.

The player character data 304c includes image data of the player character 102 arranged in the virtual game space, coordinates data indicative of a current three-dimensional position of the player character 102, the transparency, and a transparence flag. The transparence flag is a flag for determining whether a value of the transparency is to be decreased. The value of the transparency is decreased when the transparence flag is turned on. On the other hand, when the transparence flag is turned off and the value of the transparency is less than 1 (one), the value of the transparency is increased. This value of the transparency is reflected in the value of the A data of the color information. The transparency and the transparence flag that are included in the non-player character data 304d described later are also the same.

The non-player character data 304d includes image data of the non-player character 104 arranged in the virtual game space, coordinates data indicative of a current three-dimensional position of the non-player character 104, the transparency, and a transparence flag. However, when a plurality of non-player characters 104 are arranged in the virtual game space, the non-player character data is stored for each non-player character 104. The transparency and the transparence flag are not included in a non-player character data for the non-player character that is not to be made translucent or transparent among the plurality of non-player characters, that is, for the objects other than the target object.

The virtual camera data 304e includes coordinates data of a current three-dimensional position of the virtual camera (viewpoint) 200 in the virtual game space, data about a direction (direction of a line of sight) (angle data from a reference direction, or coordinates data of a gazing point), and data about an angle of view.

The target data 304f is data for distinguishing a target object whose existence in the search range 260 is detected. The smallest value data 304g is numeral data about the smallest value of the Z value detected from the Z buffer 20b, and is updated for each frame.

Although illustration is omitted, the data storage area 304 is stored with other data, and provided with a flag(s) and a counter(s) (timer(s)) required for performing game processing (information processing).

Figure 10:
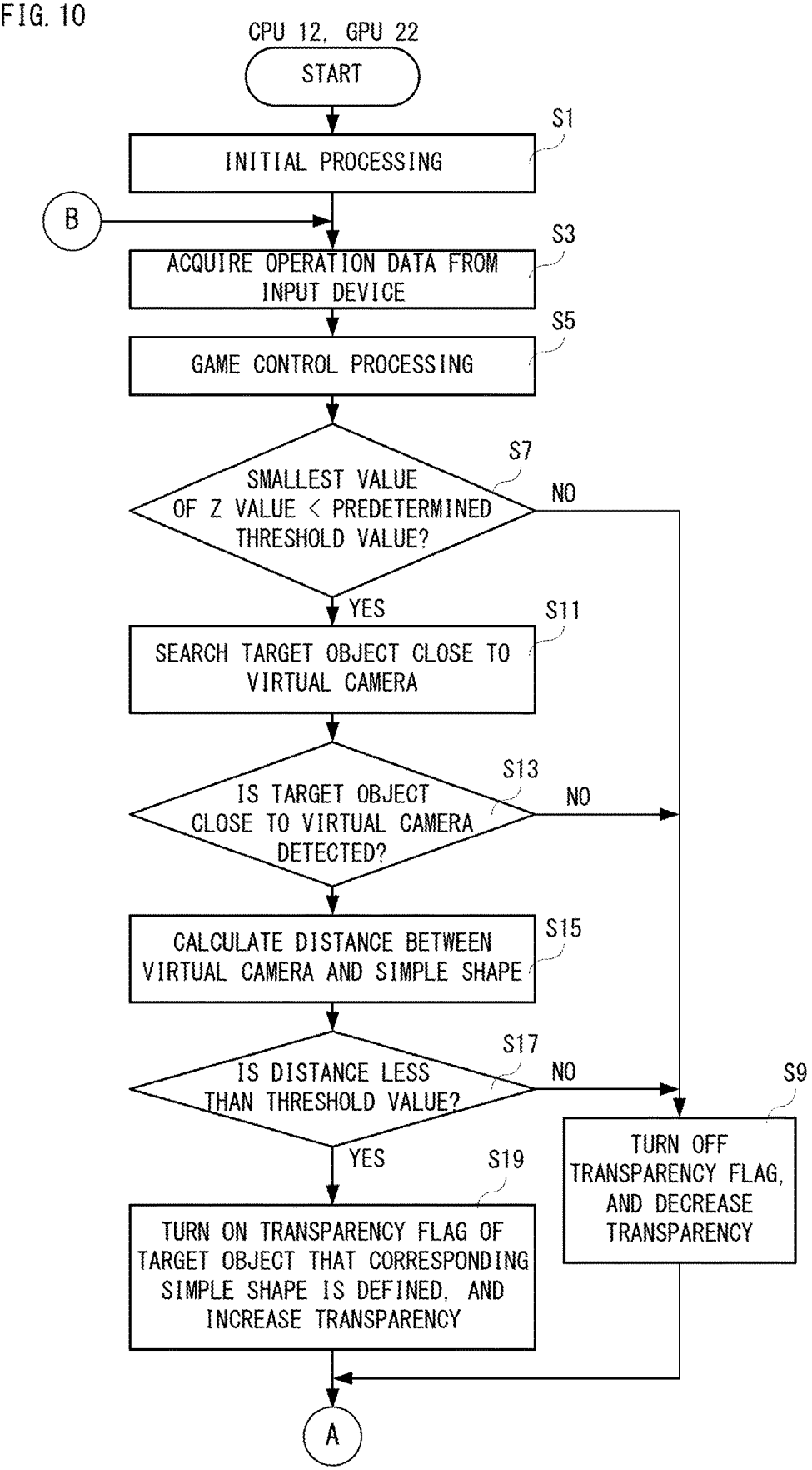
FIG. 10 is a flow chart showing a part of non-limiting example entire game processing of a CPU shown in FIG. 1.
Figure 11:
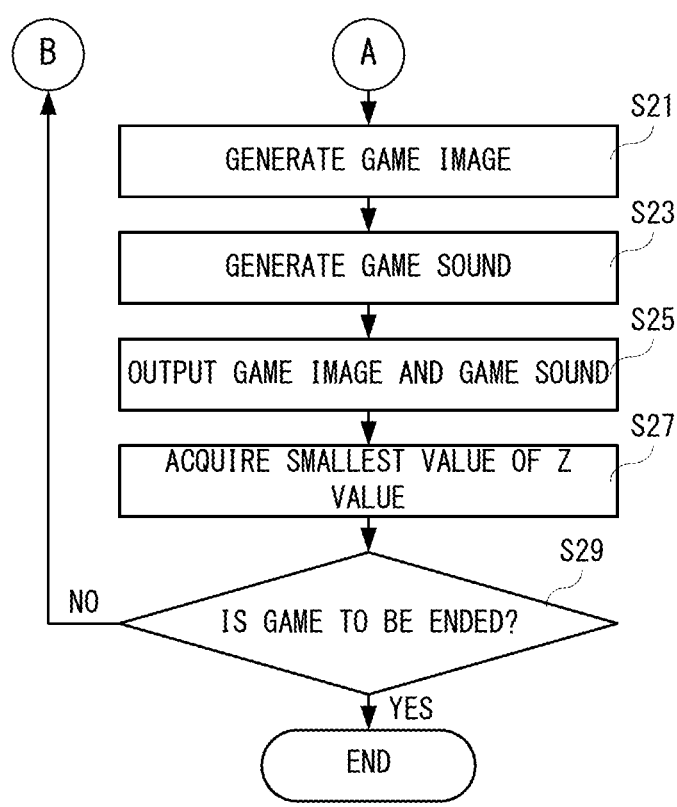
FIG. 11 a flow chart showing another part of the entire game processing of the CPU shown in FIG. 1, following FIG. 10.

FIG. 10 and FIG. 11 are flow charts showing non-limiting example entire game processing performed by the CPU 12 and the GPU 22 shown in FIG. 1. In addition, it is pointed-out in advance that processing in respective steps in the flow charts shown in FIG. 10 and FIG. 11 are mere examples, and if the same result is obtained, an order of the respective steps may be changed.

When the power supply of the game apparatus 10 is turned on, prior to performing the entire game processing, the CPU 12 executes a boot program stored in a boot ROM not shown, whereby respective components such as the main memory 20 etc. can be initialized. Then, a game program is read from the nonvolatile memory etc. and stored in the main memory 20, and the game program is started to be performed by the CPU 12.

As shown in FIG. 10, if the entire game processing is started, the CPU 12 performs initial processing in a step S1. In the initial processing, for example, the CPU 12 constructs a virtual game space for generating and displaying a game image, arranges respective objects such as the player character 102, non-player characters, etc. appearing in this virtual game space at their initial positions, and arranges respective virtual objects such as a terrain object, a mountain object, etc. appearing in this virtual game space in predetermined positions. Furthermore, the CPU 12 sets initial values of various parameters to be used in the game control processing.

Subsequently, the CPU 12 acquires, in a step S3, operation data that is input from the input device 14, and performs the game control processing in a step S5. For example, the CPU 12 makes the player character 102 move or/and causes the player character 102 to perform arbitrary actions, according to the operation data. At this time, the CPU 12 makes the virtual camera 200 move so as to follow the player character 102. Moreover, the CPU 12 makes the non-player characters 104 such as an enemy character move or/and causes the non-player character 104 to perform arbitrary actions, without following the operation data. Furthermore, the CPU 12 determines victory and defeat or ranking of the player character 102 or/and determines whether a game clear or a game over. Furthermore, the CPU 12 changes at least one of the position, the direction and the angle of view of the virtual camera 200, according to the operation data. Although the virtual camera 200 is usually located in the virtual space so as to gaze at the player character 102 and follow the player character 102 concerned while maintaining a predetermined distance with the player character 102, when at least one of the position, the direction and the angle of view is changed by an operation of the player, the virtual camera 200 is located in the position or/and direction after changed and is set at the angle of view after changed. However, even when the player does not operate, at least one of the position, the direction and the angle of view of the virtual camera 200 may be changed automatically (forcibly) depending on a context of the game.

In a next step S7, the CPU 12 determines whether the smallest value of the Z value indicated by the smallest value data 304g is less than the first threshold value. The smallest value data 304g is the smallest value of the Z value that is stored last time in a step S27 described later. A predetermined initial value is stored for the first time. If "NO" is determined in the step S7, that is, if the smallest value of the Z value is equal to or more than the first threshold value, it is possible to determine that no object is arranged near the virtual camera 200, and therefore, in a step S9, the CPU 12 turns off the transparence flag about all the target objects (non-player character data 304d), and reduces the transparency, and the process proceeds to a step S21 shown in FIG. 11. However, in the step S9, the CPU 12 does not reduce the transparency when the transparency is the minimum value, that is, when being set opaque.

On the other hand, if "YES" is determined in the step S7, that is, if the smallest value of the Z value is less than the first threshold value, the target object that is near to the virtual camera 200 is searched in a step S11. That is, the CPU 12 detects the target object included in the search range 260. At this time, the CPU 12 makes data for distinguishing individually the detected one or two or more target objects be stored as the target data 304f.

Subsequently, in a step S13, the CPU 12 determines whether a target object that is near to the virtual camera 200 is detected. If "NO" is determined in the step S13, that is, if no target object that is near to the virtual camera 200 is detected, the process proceeds to a step S9. On the other hand, if "YES" is determined in the step S13, that is, if a target object that is near to the virtual camera 200 is detected, the CPU 12 calculates, in a step S15, the distance d between the virtual camera 200 and the simple shape SH.

In a next step S17, the CPU 12 determines whether the distance d calculated in the step S15 is less than the second threshold value. That is, the CPU 12 determines whether there is any target object to be made translucent or transparent. If "NO" is determined in the step S17, that is, if the distance d calculated in the step S15 is equal to or more than the second threshold value, the process proceeds to the step S9. On the other hand, if "YES" is determined in the step S17, that is, if the distance d calculated in the step S15 is less than the second threshold value, in a step S19, the transparence flag about the target object (non-player character data 304d) that the corresponding simple shape SH is defined is turned on, and the transparency is increased, and then, the process proceeds to the step S21. However, in the step S19, the CPU 12 does not increase the transparency, when the transparency is the maximum value, that is, when being set transparent completely.

It should be noted that when a plurality of target objects are detected in the step 11, the processing of the steps S15, S17 and S19 are performed for each of the target objects.

As shown in FIG. 11, in the step S21, the CPU 12 and the GPU 22 generate a game image. Briefly describing, the CPU 12 and the GPU 22 read data representing a result of the game control processing in the step S5 from the main memory 20 and data required for generating a game image from the main memory 20, thereby to generate a game image. For example, in generating a game image, the GPU 22 writes an image of the object in the virtual space in the frame buffer 20a under instructions of the CPU 12. Although the terrain object, the player character 102, the non-player character 104, etc. are included in the objects in the virtual space, for example, the drawing is performed sequentially from the object on the deep side. At this time, the GPU 22 refers to the Z buffer 20b, and when drawing an image of the object on the front side compared to the Z value that is stored in the Z buffer 20b, the GPU 22 overwrites the image of the object at a target pixel in the frame buffer 20a, and overwrites the Z value of the object at the target pixel concerned in the Z buffer 20b. At this time, the target object (non-player character 104) is drawn with the value of the A data according to the transparency.

In a next step S23, the CPU 12 generates a game sound to be output to the speaker 18 according to the result of the game control processing in the step S5. Subsequently, the CPU 12 outputs the game image and the game sound in a step S25. That is, the CPU 12 outputs sound data of the game sound to the speaker 18 through the D/A converter 16 while outputting image data of the game image to the display device 26 through the I/F 24.

In a subsequent step S27, the GPU 22 acquires the smallest value among Z values saved in the Z buffer 20b by the processing of the step S21. Then, the CPU 12 stores (updates) the smallest value data 304g about the smallest value of the Z value in the data storage area 304. The stored smallest value of the Z value is used for determination in the processing of a frame next time. Since the smallest value of the Z value is data obtained as a result of the processing the GPU 22 performed, it is possible to acquire it without much processing cost of the CPU 12.

Then, in a step S29, the CPU 12 determines whether the game is to be ended. Determination in the step S29 is performed, for example, based on whether the game is over or whether the player gives an instruction to stop the game. It is possible to determine whether the game is over based on whether the physical strength value of the player character 102 becomes 0 (zero), for example.

If "NO" is determined in the step S29, that is, if the game is not to be ended, the process returns to the step S3 shown in FIG. 10. If "YES" is determined in the step S29, that is, if the game is to be ended, the entire game processing is terminated.

In addition, a scan time of the steps S3-S29 is 1 (one) frame.

According to this embodiment, when the smallest value of the Z value is less than the first threshold value, the target object that is near to the virtual camera is detected, and the distance between the detected target object and the virtual camera is calculated, thereby to determine whether the target object is to be made translucent or transparent. Therefore, compared to a case where the distance between the target object and the virtual camera is calculated at every time of drawing the game image, a processing cost can be decreased.

Moreover, according to this embodiment, since detection of the object that is nearer than the second threshold value to the virtual camera is performed after it is determined that any object is arranged near the virtual camera based on the Z value, determination to be performed is restricted to a situation that at least something exists near the virtual camera. Therefore, even if the determination is performed with giving a margin to the second threshold value, the object arranged near the virtual camera can be detected with a high accuracy. That is, the detection accuracy can be secured.

Furthermore, according to this embodiment, the simple shape is used when calculating the distance between the virtual camera and the target object. Since the simple shape is a shape used for collision determination of the target object, for example, it does not need to newly develop a shape for determining whether the target object is to be made translucent or transparent.

In addition, although this embodiment is described on the portable type game apparatus, the stationary type game apparatus or the game apparatus switchable between the portable type and the stationary type, a part or all of the game processing may be performed by a further game apparatus or computer that is communicably connected to the game apparatus. In such a case, a game system (image processing system) can be constituted by the game apparatus of this embodiment and the further game apparatus or computer that is communicably connected to the game apparatus.

Furthermore, the content of game, the configuration of the game apparatus and specific numerical values shown in this embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer readable storage medium storing an image processing program that is executable by a computer, wherein the image processing program comprises instructions that cause one or more processors of the computer to perform:
    a drawing step that performs, for every drawing time period, drawing processing by using a virtual camera located in a virtual space by using a Z buffer, wherein the drawing processing includes first drawing processing that is performed at a first drawing period for a first image and second drawing processing that is performed at a second drawing period for a second image, the second drawing period being after the first drawing period and the second image being output for display on a display device after the first image has been output for display on the display device;
    a determination step that determines, after the first drawing processing, whether there is a portion whose depth value is smaller than a predetermined value in the Z buffer from the first drawing processing; and
    based on determination that the portion has a depth value that is smaller than the predetermined value, a detection step that detects an object that is nearer than a predetermined criterion to the virtual camera in the virtual space,
    wherein, based on the detection of the object being nearer than the predetermined criterion and during the performed second drawing processing, the object that is nearer than the predetermined criterion to the virtual camera is not displayed or displayed with an increased transparency in the second image than the first image.

2. The storage medium according to claim 1, wherein the determination step determines whether there is a portion whose depth value is smaller than the predetermined value by determining whether a smallest value of the depth value in the Z buffer is smaller than a predetermined threshold value.

3. The storage medium according to claim 1, wherein the object is defined with a model that serves as a drawing target and a simple shape that does not serve as a drawing target, and
    the detection step detects the object that is nearer than the predetermined criterion to the virtual camera based on a positional relationship between the simple shape and the virtual camera.

4. The storage medium according to claim 3, wherein the detection step detects a candidate of the object that is nearer than the predetermined criterion to the virtual camera in a search range that is set in a part of the virtual space based on an imaging range of the virtual camera.

5. The storage medium according to claim 3, wherein the simple shape is a simple shape that is used for a collision determination.

6. The storage medium according to claim 3, wherein the detection step detects the object that is nearer than the predetermined criterion to the virtual camera based on a distance between the simple shape and a near clipping plane of the virtual camera.

7. The storage medium according to claim 1, wherein the image processing program further causes the one or more processors to perform a camera control step that controls the virtual camera based on an operation by a user.

8. The storage medium according to claim 1, wherein the image processing program further causes the one or more processors to perform a camera moving step that makes the virtual camera move according to a movement of a player character when the movement of the player character in the virtual space is controlled based on an operation of a user.

9. An imaging processing system comprising:
at least one hardware processor configured to:
perform, for every drawing period, drawing processing by using a virtual camera located in a virtual space by using a Z buffer, wherein the drawing processing includes first drawing processing that is performed at a first drawing period for a first image and second drawing processing that is performed at a second drawing period for a second image, the second drawing period being after the first drawing period and the second image being output for display on a display device after the first image has been output for display on the display device;
determine, after the first drawing processing, whether there is a portion whose depth value is smaller than a predetermined value in the Z buffer used by the first drawing processing; and
based on determination that the portion has a depth value that is smaller than the predetermined value, detect an object that is nearer than a predetermined criterion to the virtual camera in the virtual space when it is determined that there is a portion whose depth value is smaller than the predetermined value at a time of previous drawing processing,
wherein, based on the detection of the object being nearer than the predetermined criterion and during the performed second drawing processing for the second image, the object that is detected to be nearer to the virtual camera is not displayed or is displayed with an increased transparency in the second image than the first image.

10. The image processing system according to claim 9, wherein the portion whose depth value is smaller than the predetermined value is determined by whether a smallest value of the depth value in the Z buffer is smaller than a predetermined threshold value.

11. The image processing system according to claim 9, wherein the object is defined with a model that serves as a drawing target and a simple shape that does not serve as a drawing target, and
wherein detection of the object as being nearer than the predetermined criterion is further based on a positional relationship between the simple shape and the virtual camera.

12. The image processing system according to claim 11, wherein the at least one hardware processor is configured to: detect a candidate of the object that is nearer than the predetermined criterion to the virtual camera in a search range that is set in a part of the virtual space based on an imaging range of the virtual camera.

13. The image processing system according to claim 11, wherein the simple shape is used for collision determination in the virtual space.

14. The image processing system according to claim 11, wherein detection of the object as being nearer than the predetermined criterion is further based on a distance between the simple shape and a near clipping plane of the virtual camera.

15. The image processing system according to claim 9, wherein the at least one hardware processor is configured to control the virtual camera based on an operation by a user.

16. The image processing system according to claim 9, wherein the at least one hardware processor is configured to make the virtual camera move according to a movement of a player character when the movement of the player character in the virtual space is controlled based on an operation of a user.

17. An image processing apparatus, comprising:
non-transitory computer readable memory configured to store a Z buffer;
a processing system that includes at least one hardware processor, the processing system configured to:
perform, every predetermined drawing period, drawing processing by using a virtual camera located in a virtual space by using the Z buffer, wherein the drawing processing includes first drawing processing that is performed at a first drawing period for a first image and second drawing processing that is performed at a second drawing period for a second image, the second drawing period being after the first drawing period and the second image being output for display on a display device after the first image has been output for display on the display device;
determine, after the first drawing processing, whether there is a portion whose depth value is smaller than a predetermined value in the Z buffer that was used by the first drawing processing; and
based on determination that the portion has a depth value that is smaller than the predetermined value, detect an object that is nearer in the virtual space to the virtual camera than a predetermined criterion, wherein
wherein, based on the detection of the object being nearer than the predetermined criterion, the detected object is not displayed within the second image or is generated with an increased transparency in the second image.

18. An image processing method comprising:
performing, for every predetermined drawing period, drawing processing by using a virtual camera located in a virtual space by using a Z buffer, wherein the drawing processing includes first drawing processing that is performed at a first drawing period for a first image and second drawing processing that is performed at a second drawing period for a second image, the second drawing period being after the first drawing period and the second image being output for display on a display device after the first image has been output for display on the display device;
determining, after the first drawing processing, whether there is a portion whose depth value is smaller than a predetermined value in the Z buffer of the first drawing processing;
based on determination that the portion has a depth value that is smaller than the predetermined value, performing detection of an object that is nearer than a predetermined criterion to the virtual camera in the virtual space; and wherein, based on the detection of the object being nearer than the predetermined criterion and during the performed second drawing processing, the object that is nearer than the predetermined criterion to the virtual camera is not displayed or displayed with an increased transparency.

* * * * *